United States Patent
Moriarty et al.

(10) Patent No.: US 11,704,412 B2
(45) Date of Patent: Jul. 18, 2023

(54) METHODS AND SYSTEMS FOR DISTRIBUTION AND INTEGRATION OF THREAT INDICATORS FOR INFORMATION HANDLING SYSTEMS

(71) Applicant: DELL PRODUCTS L.P., Round Rock, TX (US)

(72) Inventors: Kathleen M. Moriarty, Arlington, MA (US); Ricardo L. Martinez, Leander, TX (US); Samant Kakarla, Wellesley, MA (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 16/928,695

(22) Filed: Jul. 14, 2020

(65) Prior Publication Data
US 2022/0019670 A1    Jan. 20, 2022

(51) Int. Cl.
G06F 21/57 (2013.01)
H04L 9/40 (2022.01)
G06F 21/55 (2013.01)

(52) U.S. Cl.
CPC ......... G06F 21/577 (2013.01); G06F 21/554 (2013.01); H04L 63/1433 (2013.01)

(58) Field of Classification Search
CPC ............ G06F 21/577; G06F 21/554; G06F 2221/033; H04L 63/1433
See application file for complete search history.

(56) References Cited

U.S. PATENT DOCUMENTS

| | | | |
|---|---|---|---|
| 2004/0088565 A1* | 5/2004 | Norman | H04L 63/1433 726/22 |
| 2007/0006314 A1* | 1/2007 | Costa | G06F 21/577 726/25 |
| 2016/0162269 A1* | 6/2016 | Pogorelik | G06F 8/61 717/174 |
| 2018/0308026 A1* | 10/2018 | Sinha | G06Q 10/0635 |
| 2020/0136994 A1* | 4/2020 | Doshi | H04L 67/12 |
| 2020/0311281 A1* | 10/2020 | Boulton | G06F 21/577 |

(Continued)

FOREIGN PATENT DOCUMENTS

WO    WO-0239693 A2 *   5/2002   ............ G06Q 10/10

OTHER PUBLICATIONS

Barger, "The Best Threat Intelligence Feeds—ThreatConnect Intelligence-Driven Security Operations", Threatconnect.com Blog, May 2016, 7 pgs.

(Continued)

Primary Examiner — Meng Li
(74) Attorney, Agent, or Firm — Egan, Enders & Huston LLP.

(57) ABSTRACT

Methods and systems are provided that may be implemented in an automated manner to distribute and integrate information regarding threat indicators as they occur in real time. The provided methods and systems may be implemented to combine threat indicator characteristic information in real time with application behavior patterns, information handling system types, and/or application types; and to automatically apply the resulting intelligence together to improve malicious attack defense at the application and information handling system level at scale.

24 Claims, 4 Drawing Sheets

(56) References Cited

U.S. PATENT DOCUMENTS

2021/0124830 A1* 4/2021 Dinh ................ G06F 21/577
2021/0264033 A1* 8/2021 Quigley ............ G06Q 10/0635

OTHER PUBLICATIONS

Jones et al., CBOR Web Token (CWT), Internet Engineering Task Force, May 2018, 25 pgs.
Hoffman et al., Concise Binary Object Representation (CBOR), Internet Engineering Task Force, Oct. 2013, 47 pgs.
Schmidt et al., "Concise Software Identification Tags", SACM Working Group, Apr. 2020, 66 pgs.
Field et al., "Definition of ROLIE CSIRT Extension", MILE Working Group, Oct. 2019, 17 pgs.
Sieira, "Threat Intelligence Indicators Are Not Signatures//InfoSec Zanshin//Thoughts on Information Security, Entrepreneurship and More, Personal Blog of Alexandre Sieira", Feb. 13, 2016, 3 pgs.
Banghart et al., "Ietf-Mile-Rolie-Csirt-06-Definition of ROLIE CSIRT Extension", Datatracker, Printed from Internet Jun. 28, 2020, 1 pg.
Mandyam et al., "Ietf-Rats-Eat-03-The Entity Attestation Token (EAT)", RATS Working Group, Feb. 2020, 2 pgs.
Birkholz et al., "Ietf-Sacm-Coswid-15-Concise Software Identification Tags", SACM Working Group, May 2020, 2 pgs.
ISO/IEC 19770-2:2009, "Information Technology-Software Asset Management—Part 2: Software Identification Tag", Printed from Internet Jun. 28, 2020, 2 pgs.
Jones et al., "JSON Web Token (JWT)", Internet Engineering Task Force, May 2015, 28 pgs.
Microsoft, "Manage Indicators", Jun. 2020, 10 pgs.
Bray, "RFC 8259—The JavaScript Object Notation (JSON) Data Interchange Format", Internet Engineering Task Force, Dec. 2017, 2 pgs.
Field, "RFC 8322-Resource-Oriented Lightweight Information Exchange", Internet Engineering Task Force, Feb. 2018, 22 pgs.
Lear et al., "Manufacturer Usage Description Specification", Internet Engineering Task Force, Mar. 2019, 60 pgs.
CSRC, "SWID Tagging Specifications And Guidelines-Software Identification (SWID) Tagging CSRC CSRC", Jun. 22, 2020, 2 pgs.
Pokorny, "Threat Intelligence Feeds: Overview, Best Practices, and Examples", Recordedfuture.com, May 2019, 3 pgs.
McAfee, "What is Endpoint Detection And Response? EDR Security", Printed from Internet Jun. 24, 2020, 3 pgs.
"What Is Threat Intelligence Feed (TI Feed)?—Definition From WhatIs.com", Printed from Internet Jun. 13, 2020, 1 pgs.
Moriarty, "Coordinating Attack Response at Internet Scale (CARIS) Workshop Report", Casis Report, Nov. 2016, 21 pgs.
Moriarty, "Driving Towards More Effective Sharing Models", RSA Conference, Jan. 2014, 2 pgs.
Moriarty, Information Sharing Post-Snowden, What Changes?, RSA Conference, Feb. 2014, 8 pgs.
Moriarty et al., Coordinating Attack Response at Internet Scale (CARIS) Workshop Report, Internet Architecture Board, Mar. 2017, 21 pgs.
Moriarty, "Who Is Leading The Discussion On Infomration-Sharing and How Can It Be Transformed?", RSA Conference, Feb. 2014, 10 pgs.
"10 Best EDR Security Services in 2020 for Endpoint Protection", Printed from Internet Jun. 24, 2020, 5 pgs.

* cited by examiner

METHODS AND SYSTEMS FOR DISTRIBUTION AND INTEGRATION OF THREAT INDICATORS FOR INFORMATION HANDLING SYSTEMS

FIELD OF THE INVENTION

This application relates to operating systems of information handling systems and, more particularly, to threat indicators used during operation of information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Threat indicator or indicators of compromise (IoCs) may be used to detect corresponding known malicious activity and are often specific to types of information handling systems, and types of applications executing thereon. Applications executing on information handling systems also have expected behavior patterns that are predictable. Currently, threat indicator characteristic information, behavior patterns, information handling system types, and application types are independently evaluated, and only manually associated through manual mechanisms such as reviewing release notes and version/revision strings.

Threat indicators are discovered as part of investigations into attacks or attack attempts. The existence of a successful attack may be tipped off by the presence of a known threat indicator or IoC and may lead to the discovery of additional IoCs. These IoCs may be logically grouped and associated to an attack and may even be associated to specific threat actors. These groupings and the threat indicator characteristic distribution process are centered on the attack type or on the threat actor for attribution. However, threat indicators are often not connected to the specific type of information handling system on which they are relevant. Moreover, mapping to specific vulnerabilities has to be performed and often requires human intervention. Although this mapping connects the impacted application, vulnerability and threat indicators, it still has to be applied out with knowledge of the environment controls to detect the presence of IoCs.

Threat hunters may be responsible for finding the IoCs that are indicative of an attack. These threat hunters may be security staff at an organization (such as corporation and government entity) or a group/organization dedicated to that purpose. Threat indicator information is currently received by network endpoint organizations through threat intelligence feeds (e.g., open source threat intelligence feeds provided by the SANS Technology Institute of Philadelphia, Pa. (SANS) and US-CERT from CISA of the United States Department of Homeland Security (CERT), or from commercial vendor feeds such as the MITRE Corporation of Bedford, Mass. (MITRE)), shared repositories for incident information exchange communities, or from threat intelligence vendors. IoCs may also be discovered within an organization. In any case, information regarding the IoCs is then individually applied by each organization that receives them to network infrastructure in places where the threats may be discovered. This involves manual processes as well as skilled threat analysts, which are scarce resources.

In one conventional technique, analysts determine if baseline accepted behaviors (allow list, preferred) should be created or require updating. Next for those not willing to deploy allow lists on more complex applications with variations of behavior possible between configurations, known behaviors to block are determined. IoCs, in additional to behavior patterns, may also include static values associated with an attack vector such as a hash of a file or a key phrase. This analysis and distribution pattern for expected behaviors is known and can be seen in the Manufacturer Usage Description, Internet Engineering Task Force (IETF) RFC8520 where the manufacturer releases new Manufacturer Usage Description (MUD) files with behaviors and actions. The MUD file pattern is specific to a system and not individual to specific software. MUD is specific to constrained devices where creating a profile from the manufacturer is possible. This process enables multiple parties to contribute control sets to apply to systems in order to detect unusual/unexpected behavior patterns and known indicators of compromise, preferably through allow list approaches when possible.

Separate firewalls and intrusion prevention systems are available to identify and control threats, but at a network chokehold that is coupled between the network and endpoint information handling systems that are coupled to the network. These firewalls and intrusion prevention systems are separate from the endpoint information handling systems coupled to the network, and receive threat indicator characteristic information (i.e., containing information regarding actionable IoCs) that is distributed and automatically updated over the network. Such a firewall or instruction prevention system implements controls and manage threats at the network chokehold when IoCs are discovered, by blocking the associated threats from reaching the endpoint information handling systems that are coupled to the network.

Providers of basic input/output system (BIOS), firmware, operating system (OS), and applications for an information handling system who profile the expected behavior are not the same as the vendor who issues the control sets for monitoring or actions. This is because the discovery of IoCs associated to attacks may be performed separately from IoCs discovered through vulnerability discovery and remediation. IoCs that may be received into an organization today via a threat feed may be specific to software or firmware, but the vendor of that firmware is not necessarily made aware. The IoCs are instead provided to individual organizations to apply. Thus, the existing conventional processes and architectural patterns for receiving and acting on threat indicator characteristic information are highly inefficient, not only leading to duplicated work for each organization, but also presenting an impossible management task for many organizations who do not have the resources to deploy or manage these threat indicators.

SUMMARY OF THE INVENTION

Methods and systems are disclosed herein that may be implemented in an automated manner to distribute and integrate information regarding threat indicators or indicators of compromise (IoCs) as they occur in real time. The disclosed methods and systems may be implemented to combine threat indicator characteristic information in real time with application behavior patterns, information handling system types, and/or application types; and to automatically apply the resulting intelligence together to improve malicious attack defense at the application and information handling system level at scale. This is in contrast to conventional solutions where IoCs are grouped by an attack or attack framework.

In further contrast to conventional threat indicator information distribution techniques, the disclosed methods and systems may be implemented in one embodiment with host level detection and distribution mechanisms to directly integrate both threat indicator (e.g., IoC) information and behavior patterns at a management system level, host (operating system) level, or application level. Such an embodiment allows security management tasks to be shifted to endpoint information handling systems that are coupled to a network, thus enabling the endpoint systems to perform threat detection and prevention in a manner that is compatible with, and complements, strong end-to-end network encryption.

In one embodiment, a method and system architecture may be implemented to provide automation of threat indicator (e.g., IoC) information distribution and threat indicator detection in a manner that advantageously enables a threat response to scale that accommodates lack of technical skill at the system user level, and so as to integrate and enable automatic threat indicator detection on information handling systems deployed by small and medium sized organizations. In such an embodiment, the disclosed method and system architecture may be implemented to alter how threat indicators are traditionally grouped, and to alter those entities who are involved in the distribution and application of threat indicators, as well as to alter how information describing the threat indicators is distributed to more effectively apply this information to identify IoCs and their associated threats.

In one embodiment, specific IoCs and specific behavior patterns may be directly associated with target code (e.g., basic input/output system, operating system, libraries, applications, firmware, software, etc.), and the target code may be distributed together with IoCs across a network by a provider of the target code (e.g., owner, vendor and/or creator) or another trusted source directly to management logic for the target code (e.g., operating system, management application, firmware, basic input/output system (BIOS), etc.) executing on endpoint information handling systems upon which the code is executing. Alternatively, the associated IoCs and behavior patterns may be distributed across a network to a designated management information handling system that is coupled and programmed with management logic to monitor other endpoint information handling systems upon which the target code is executing. Examples of threat indicator or IoCs information include, but are not limited to, lists of known malware hashes, code that is shared on pastebins, suspicious domains, IP addresses that are associated with malicious activity, etc.

In one embodiment, the associations between the target code and corresponding IoCs and behavior patterns may be created with the target code and may be distributed directly by the owner and/or creator of the target code to be discovered by management logic of the endpoint information handling systems, or by the designated management information handling system (when present). This advantageously allows the management logic of the endpoint information handling systems (or the designated management information handling system) to enact controls to detect the IoCs on the endpoint information handling systems and prevent their corresponding threats where they may have the most impact.

In one embodiment, an association between IoCs, behavior patterns and target code may originate from a vendor of the target code and/or one or more threat intelligence feeds that provide streams of threat indicator characteristic information that are updated in real time to management logic executing on an endpoint information handling system, or to a designated management information handling system that is monitoring other endpoint information handling systems. Example of such threat intelligence feeds include, but are not limited to, SANS Technology Institute of Philadelphia, Pa. (SANS) and US-CERT from CISA of the United States Department of Homeland Security (CERT) open source threat intelligence feeds, as well as commercial threat intelligence feeds available from threat intelligence companies. In a further embodiment, expected behavior patterns may additionally be created or updated based on updates to the target code (e.g., software), environment, or as a result of newly discovered threats or altered versions of known threats.

Using the disclosed methods and systems, behavior patterns may also include behaviors associated with threats that may be alerted on (or blocked) in a denylist mode, which may be alternatively or additionally implemented with an allow list mode. In one embodiment a deny list technique may be implemented (e.g., by management logic executing on an endpoint information handling system, or by a designated management information handling system) where it is desired to block bad behavior of known threats. In another embodiment, an allow list technique may be implemented to only allow expected behaviors, e.g., where it is not yet desired to block all but expected behaviors.

In one embodiment, a designated management information handling system may be implemented as a management station coupled between a network and one or more other endpoint information handling systems that are running a target code (e.g. library, application, firmware, software, etc.) that is associated with one or more IoCs that are identified to affect that target code. In such an embodiment, the management station may be programmed to monitor and assess the system state of each of the other endpoint information handling systems in real time, and to identify in real time if any associated IoCs are found to be present on any of the monitored other endpoint information handling systems. In the case that one or more associated IoCs are found to be present on any of the other endpoint information handling systems, the management station may automatically issue an alert and/or take one or more automatic predetermined actions in real time, e.g., such as isolating the affected system or affected target code, preventing or blocking network traffic associated with the IoCs, etc. Where, an automated alert is issued, such steps may be manually taken, e.g., by an endpoint system user or an administrator.

In another embodiment, management logic (e.g., operating system, separate management application, firmware, BIOS, etc.) executing directly on an endpoint information handling system may receive information regarding IoCs and behaviors associated with a target code. In one example, management logic may be implemented within the target code itself and may be programmed to utilize controls included with the target code to utilize the received IoCs to detect the associated IoCs. In other embodiments, system level capabilities (e.g., firmware or BIOS-initiated) may be programmed and triggered to detect associated IoCs. In any case, automatic actions may be taken to address an IoC upon discovery of its presence on the individual endpoint information handling system, or an alert may be automatically generated to a user or administrator to prompt manual steps that are taken (e.g., by an endpoint system user or administrator) in response to the automated alert. It is also possible that resiliency requirements may factor into the detection, alerting, and courses of action pursued for any particular system or groups of managed systems.

In one embodiment of the disclosed methods and systems, threat indicator discovery and distribution may be implemented to involve the application or code owner so as to allow intelligent application of the threat indicator characteristic information into preventative controls. This is in contrast to conventional techniques in which threat indicator discovery and distribution is disconnected and independent from the application or code owner, so that application of threat indicators and controls may therefore only be discovered by a small number of independent experts who are different from the application or code owner. Further, since the application or code owner is involved with threat indicator discovery and distribution, additional preventive controls that may include the prevention of behavior patterns that are anomalous or unexpected may be correlated in this embodiment to the threat indicators, and threats that include IoCs that are variants of the initially discovered and shared indicators may be detected in a manner that is not possible using conventional techniques. In addition, IoCs that may be generalized to catch variants of the initial IoCs may be developed and deployed universally.

In a further embodiment, correlation of vulnerability remediation (including vulnerabilities patching to prevent certain IoCs from being possible) to IoCs is may be reliably accomplished since threat indicators are considered as part of the vulnerability disclosure and remediation process. This is in contrast to conventional techniques in which threat indicators are separated in process from the vulnerability disclosure and remediation process.

In one embodiment disclosed herein, an association between a software descriptor, baseline behaviors, and IoCs may be structured through claims in an extension to an existing format or attestation format or a structured list or other format. Unlike conventional techniques, a connection between target code and vulnerabilities may be made without requiring an extra manual processing step that is conventionally employed to connect IoCs and then to manually apply them. In another embodiment disclosed herein, a signature may be provided from a trusted source in order to enact controls to detect variances from expected behavior or act/alter on IoCs. The actionable information may be distributed across a network/s as a code information data set that lands on individual endpoint systems hosting the software (that may each be managed by a process executing on the individual information handling system itself) or that lands on a management information handling system that may also verify the authority of the signer before acting on the provided data sets.

Thus, with particular regard to IoCs, the disclosed systems and methods may be advantageously implemented in one embodiment to provide a new system architecture for an effective distribution of IoCs that are used to detect and thwart attacks. The IoCs may be provided to a specific target code provider to ensure they understood any vulnerabilities exploited that resulted in the generation of the corresponding IoCs, and so that they have the opportunity to prevent the corresponding IoC from being realized. The IoCs may also be distributed to a management information handling system (e.g., IT management system) that acts as a coordinating point for all endpoint systems on a network that may use that target code, e.g., when it is desired architecturally to use a single management point for distribution and management within an organization. The management information handling system may then apply how the IoCs are used to detect corresponding IoCs (i.e., the threats themselves). The architecture of this embodiment advantageously provides the potential for the distributed IoCs to reach any given information handling system running the applicable target code so that attacks may be detected and thwarted on the given information handling system, i.e., rather than only on those information handling systems that are operated by very large organizations and corporations which have the human resources that are able to apply threat information. The methodology and architectural pattern of the disclosed embodiments may therefore be employed to implement information handling system security in a "built-in" or elemental manner for information handling systems executing the target code.

The following aspects may implement alone or in any combination using the disclosed systems and methods: 1) IoCs may be directly connected to software descriptors; 2) Intelligence may be directly provided to points of interest (target code, endpoint information handling systems that are directly impacted, etc.), where threat indicators or variations of behavior can be detected; 3) Intelligence, as opposed to threat indicators, may be distributed directly to administrators of an application or information handling system, meaning the information handling system may automatically apply this intelligence to alert on or block threats or unexpected behavior patterns, e.g., to establish a new method and system architecture that enables automation in a new and effective way; 4) A combined data set of a software descriptor, expected behavior patterns, and IoCs may be digitally signed and may be verified as being from a trusted source; 5) A software inventory may be implemented as the point of intelligence for application programming interfaces (APIs) and management systems to enact controls, allowing for insight into the sources and resulting controls, yet abstracting the actions to ease management costs and reduce the resources needed at each organization. Centralized expert information may be distributed as knowledge to the points of impact; 6) A software descriptor and validated signature from a target code creator may be used to form an allow list of permitted applications or application providers (chained trust from certificate).

In one respect, disclosed herein is a method, including: developing a target code; then associating the target code with one or more threat indicators and/or one or more behaviors; then creating a data set including the target code and the one or more associated threat indicators and/or behaviors; and then providing the data set across a network from a first information handling system to at least one other information handling system that includes an endpoint information handling system or a second information handling system coupled to and managing the endpoint information handling system.

In another respect, disclosed herein is a system, including: at least one first information handling system including a first programmable integrated circuit and being coupled to a first network, the first information handling system accessing a data set including a target code and one or more threat indicators and/or one or more behaviors associated with the target code; and at least one second information handling system including a second programmable integrated circuit and being coupled to the first network. The first programmable integrated circuit of the first information handling system may be programmed to provide the data set across the first network from the first information handling system to the second information handling system. The second programmable integrated circuit of the second information handling system may also be programmed to: use the associated threat indicators and/or behaviors from the data set to detect the presence of a threat associated with the target code executing on an endpoint information handling system, and then take at least one automatic action and/or provide at least one alert only upon detection of the presence of the threat associated with the target code on the endpoint information handling system. The one or more behaviors may include at least one of expected behaviors associated with the target code or unexpected behaviors associated with the target code.

In another respect, disclosed herein is an information handling system, including a programmable integrated circuit programmed to receive a data set across a first network, the data set including a target code and one or more threat indicators and/or one or more behaviors associated with the target code. The programmable integrated circuit of the information handling system may be further programmed to: use the associated threat indicators and/or behaviors from the data set to detect the presence of a threat associated with the target code when executing on an endpoint information handling system; and then take at least one automatic action and/or provide at least one alert only upon detection of the presence of the threat associated with the target code when executing on the endpoint information handling system.

DESCRIPTION OF ILLUSTRATIVE EMBODIMENTS

Figure 1:
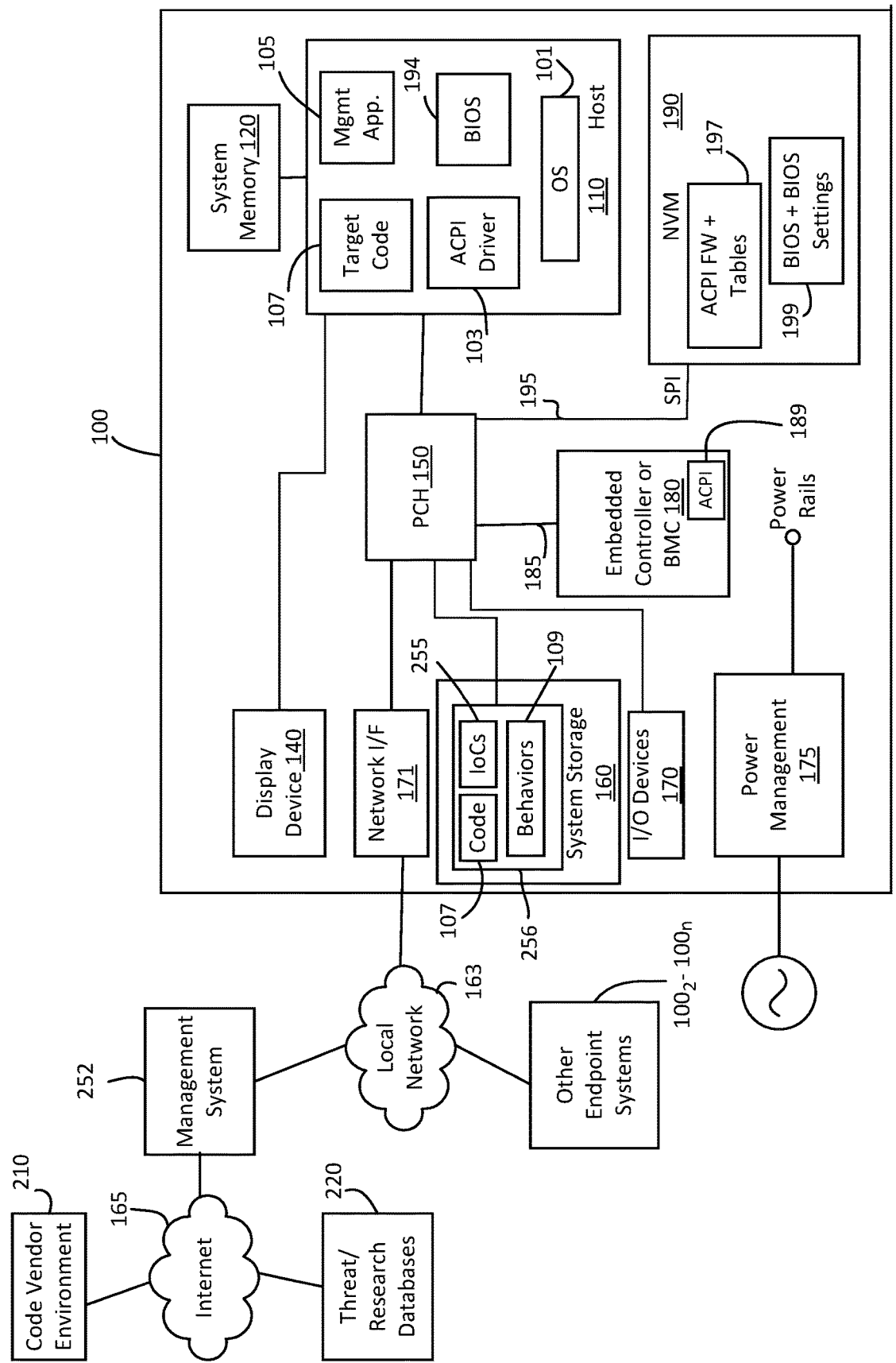
FIG. 1 illustrates a block diagram of an information handling system according to one exemplary embodiment of the disclosed methods and systems.

FIG. 1 is a block diagram of a network endpoint information handling system 100$_1$ (e.g., a desktop computer, laptop computer, tablet computer, MP3 player, personal data assistant (PDA), cell phone, etc.) as it may be configured according to one embodiment of the disclosed methods and systems. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed methods and systems, the information handling system is not restricted to including only those components shown in FIG. 1 and described below.

As shown in FIG. 1, endpoint information handling system 100$_1$ may generally include a host programmable integrated circuit 110 for executing an operating system (OS) 101 (e.g., Microsoft Windows 10, Linux OS, etc.) and BIOS 194 for system 100, and other code such as user software applications which may include a target code 107 (e.g., word processing application such as Microsoft Word®, slide presentation software such as Microsoft PowerPoint®, email application such as Microsoft Outlook®, photo editing application such as Adobe Photoshop®, Internet browser such as Microsoft Edge®, computer game such as Activision Call of Duty®: Modern Warfare, PDF viewer such as Adobe Acrobat®, spreadsheet application such as Microsoft Excel®, etc.), and optional management application 105. When present, optional management application 105 may include programming to receive and store a code information data set 256 that includes IoCs 255 together with expected behavior patterns 109 that are associated with a target code 107 by software descriptors, and to use information from this received information data set 256 to detect the presence of IoCs that correspond to threats associated with the target code 107 (e.g., user application, etc.). Management application 105 may also including programming/logic to take automatic preventative actions and/or issue alerts regarding the detection of same. In other embodiments, some or all of these same security functionalities (e.g., including threat detection and automatic preventive actions and/or alerts) may be programmed into and implemented by other code executing as management logic on information handling system 100$_1$, e.g., such as BIOS 194, OS 101, Advanced Configuration and Power Interface (ACPI) driver 103 and associated firmware 197, and/or target code 107 itself. In one embodiment, code such as management application 105 and target code 107 may be parts of a manufacturer or vendor-supplied OEM software image that includes an original OEM OS and that is shipped with system 100$_1$ to the end user. In yet other embodiments, the functionality of management application 105 described herein may be alternately performed in whole or in part by code executing on embedded controller (EC) or baseboard management controller (BMC) 180 when one of these programmable integrated circuits is present on system 100.

In FIG. 1, host programmable integrated circuit 110 may be configured to access non-volatile memory 190 (e.g., serial peripheral interface (SPI) Flash memory) to load and boot part of a system BIOS 194. Other non-volatile memory (NVM) devices may be additionally or alternatively present, e.g., including solid state drive/s (SSDs), hard drive/s, etc. Host programmable integrated circuit 110 may include any type of processing device, such as an Intel central processing unit (CPU), an Advanced Micro Devices (AMD) CPU or another programmable integrated circuit. Host programmable integrated circuit 110 is coupled to system memory 120, which may include, for example, random access memory (RAM), dynamic RAM (DRAM), synchronous DRAM (SDRAM).

In the illustrated embodiment, host programmable integrated circuit 110 may be coupled to an external or internal (integrated) display device 140 (e.g., LCD or LED display or other suitable display device) depending on the particular configuration of information handling system $100_1$. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system $100_1$.

Also shown present in FIG. 1 is local system storage 160 (e.g., one or more media drives, such as hard disk drives, optical drives, NVRAM, Flash memory, solid state drives (SSDs), or any other suitable form of internal or external storage) that is coupled through PCH 150 to provide non-volatile storage for information handling system $100_1$.

A power source for the information handling system $100_1$ may be provided via an external power source (e.g., mains power) and an internal power supply regulator, and/or by an internal power source, such as a battery. As shown in FIG. 1, power management system 175 may be included within information handling system $100_1$ for moderating the available power from the power source. In one embodiment, power management system 175 may be coupled to provide operating voltages on one or more power rails to one or more components of the information handling system $100_1$, as well as to perform other power-related administrative tasks of the information handling system.

Embedded controller (EC) 180 is coupled to PCH 150 and may be configured to perform functions such as power/thermal system management, etc. EC 180 may also be configured to execute program instructions to boot information handling system $100_1$, load application firmware from NVM 190 into internal memory, launch the application firmware, etc. In one example, EC 180 may include a processing device for executing program instructions to perform the above stated functions. In other embodiments, such as where information handling system 100 is implemented as a server or storage platform, these and other functionalities described herein for EC 180 may alternatively be performed by a baseboard management controller (BMC) that is coupled to PCH 150 instead of an EC 180. Although not strictly limited to such, processing device of EC (or BMC) 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

In the embodiment of FIG. 1, PCH 150 controls certain data paths and manages information flow between components of the information handling system $100_1$. As such, PCH 150 may include one or more integrated controllers or interfaces for controlling the data paths connecting PCH 150 with host programmable integrated circuit 110, system storage 160, input/output (I/O) devices 170 forming at least a part of a user interface for the information handling system, network interface (I/F) device 171 (e.g., network interface controller or "NIC"), embedded controller (EC) 180 executing ACPI firmware instance 189, and NVM 190 where BIOS firmware image and settings 199 may be stored together with other components including ACPI firmware 197. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

As shown, external and/or internal (integrated) I/O devices 170 (e.g., a keyboard, mouse, touchpad, touchscreen, etc.) may be coupled to PCH 150 of system $100_1$ to enable the system end user to input data and interact with information handling system $100_1$, and to interact with application programs or other software/firmware executing thereon. In this embodiment, the network I/F device 171 (e.g., network interface controller (NIC)) enables wired and/or wireless communication with an optional management information handling system 252 across a first local network 163 such as a corporate intranet, local area network (LAN), wireless LAN (WLAN), etc. Management information handling system 252 is in turn coupled to communicate via a second network 165 (e.g., the Internet, a wide area network, etc.) with information handling systems that implement a code vendor environment 210 and threat and research databases 220 that are shown in FIG. 2.

In one embodiment, an optional management information handling system 252 may be configured with similar system architecture and components as information handling system $100_1$ of FIG. 1, and may be implemented as a server that is programmed with logic to monitor and manage information handling system 100 in a manner described further herein. As further shown, other network information handling systems $100_2$-$100_N$ having similar configuration to system $100_1$ may also be coupled to local network 163 to form a group 290 of managed endpoint information handling systems $100_1$-$100_N$ as further illustrated and described in relation to FIG. 2. It will be understood that in other embodiments, it is possible that managed endpoint information handling systems $100_1$-$100_N$ may be alternately coupled to a management information handling system 252 by the same network 165 that couples the management information handling system 252 with the information handling systems that implement a code vendor environment 210 and threat and research databases 220.

Figure 2:
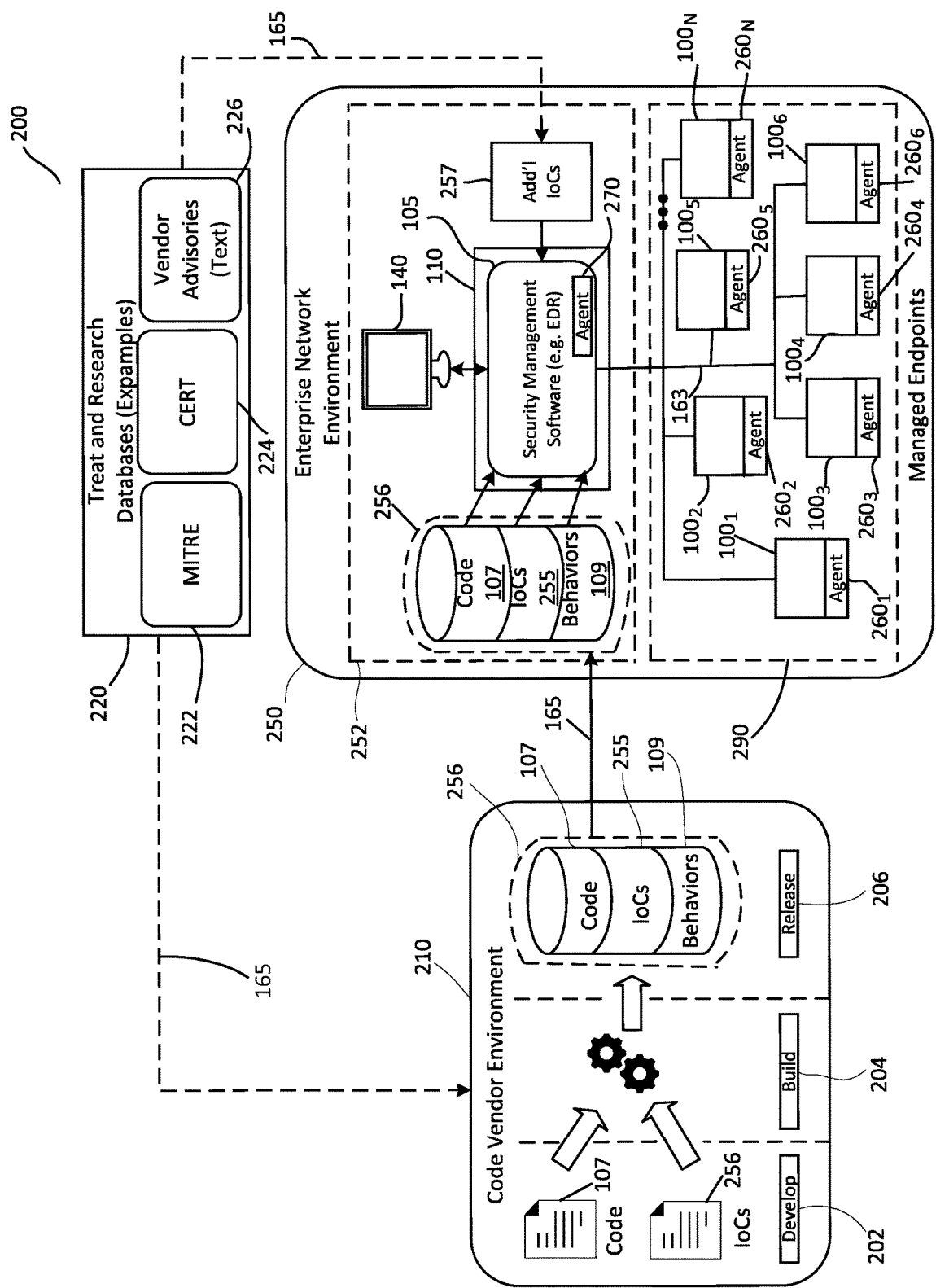
FIG. 2 illustrates an architecture and methodology according to one exemplary embodiment of the disclosed methods and systems.

FIG. 2 illustrates one exemplary embodiment of an architecture and methodology 200 for implementing automated distribution of threat indicator (e.g., IoC) information and detection of IoCs on a group 290 of multiple managed endpoint information handling systems $100_1$ to $100_N$ of an enterprise network environment 250. In the embodiment of FIG. 2, enterprise network environment 250 includes a management information handling system 252 (e.g., a server information handling system) that acts as a managed security portal that is coupled to monitor and manage the multiple endpoint information handling systems $100_1$ to $100_N$ across local network 163 (e.g., a corporate intranet), although in another embodiment a management information handling system 252 may be alternatively coupled to monitor and manage the multiple endpoint information handling systems $100_1$ to $100_N$ across the same network 165. It will be understood that the number of managed endpoint information handling systems 290 illustrated in FIG. 2 is exemplary only and that an enterprise network environment 250 may include any number of one or more managed information handling systems 100. It will also be understood that the hardware configuration of management information handling system 252 may be similar to that illustrated for information handling system $100_1$ in FIG. 1, with a host programmable integrated circuit executing security management software (e.g., Endpoint Detection and Response "EDR") as shown in FIG. 2.

Still referring to FIG. 2, code vendor environment 210 (e.g., code owner, vendor and/or creator) operates to create and provide new target code 107 by performing the steps of developing 202, building 204 and releasing 206 of the new target code 107 (e.g. which may be library or libraries, application, firmware, software, etc.). One example of new target code 107 is a particular release version of word processing or spreadsheet application (e.g., such as a particular release version of Microsoft Word® or Microsoft Excel®) that is provided by a code vendor environment (e.g., such as Microsoft Corporation). Moreover, new target code 107 may be created and provided for each release of updates to the target code 107 (e.g., such as Microsoft Office® update download provided by Microsoft Corporation. Code vendor environment 210 may employ one or more information handling systems that are coupled to Internet 165 or other suitable network, and that are similarly configured to system 100 of FIG. 1, but instead programmed to assist with the performance of the steps of developing 202, building 204 and releasing 206 of the new target code 107 across Internet 165 or other suitable type of network of a given application.

In FIG. 2, code vendor environment 210 also internally develops one or more other components of a code information data set 256 that includes IoCs 255, e.g., when the code owner, vendor and/or creator of code 107 becomes aware of vulnerabilities, active exploits, and/or the IoCs which are associated with target code 107. Additionally or alternatively, the code owner, vendor and/or creator of code 107 may obtain IoCs 255 from one or more feeds or one-off notifications provided to management system 252 across Internet 165 from threat and research databases 220 (e.g., open source threat intelligence feeds provided by the SANS Technology Institute of Philadelphia, Pa. (SANS) and US-CERT from CISA of the United States Department of Homeland Security (CERT), or from commercial vendor feeds such as the MITRE Corporation of Bedford, Mass. (MITRE)). Examples of IoCs 255 include, but are not limited to lists of known malware file hashes, code that is shared on pastebins, suspicious domains, IP addresses that are associated with malicious activity, etc.

In the embodiments of FIG. 2, the particular target code 107 is associated in the code vendor environment 210 with IoCs 255, for example, by association steps such as the expected behaviors of port, protocol, IP address connections, application programming interface (API) and system component interactions. Code vendor environment 210 may also operate to determine expected behaviors 109 associated with target code 107. Examples of such expected behaviors 109 include, but are not limited to, application requests to execute in the appropriate processor or programmable integrated circuit, trusted execution environment processor "TEE" processing area of host programmable integrated circuit 110, Rich Execution Environment and Trusted Execution Environment processor "REE" processing area of host programmable integrated circuit 110, graphics processing unit "GPU", etc.), protocol, ports, and IP address connections as expected. Each of the associated IoCs 255 and expected behaviors 109 may be combined with the released code 107 as part of code information data set 256. In this way, threat intelligence (e.g., IoCs) 255 and/or baseline behaviors 109 may in one embodiment be grouped by and provided for each release of target code 107, rather than by type of malicious attack.

As further shown in FIG. 2, the code information data set 256 that includes released new target code 107, IoCs 255 and/or baseline behaviors 109 is provided across the Internet 165 to management information handling system 252 (e.g., an information technology "IT" management system, a Security Event and Incident Management System, etc.) where it may be stored as shown (e.g., on system storage 160 of management information handling system 252). The new target code 107 may then be deployed from code information data set 256 by management application 105 executing on management information handling system 252 for installation and execution on each of managed endpoint information handling systems $100_1$-$100_N$. Since the specific target code 107 is already associated with corresponding IoCs 255 and/or baseline behaviors 109 when provided by code vendor environment 210, these IoCs 255 and/or baseline behaviors 109 may be directly used by management application 105 executing on management information handling system 252 to target computing activity associated with execution of target code 107 on monitored systems $100_1$-$100_N$ of FIG. 2 in order to detect threats corresponding to execution of target code 107 on each of these systems, i.e., without requiring any further action to associate IoCs 255 or baseline behaviors 109 with target code 107.

Distribution of code information data set 256 not only enables faster remediation and update options to counter threat activity, but also significantly improves distribution of IoCs 255 and baseline behaviors 109 to reach an entire user base (e.g., including systems of enterprise network environment 250) identified by the originator of the target code 107 (e.g., code vendor environment 210) and/or a trusted threat feed provider (e.g., threat and research databases 220) as described herein. Since IoCs 255 and expected baseline behavioral patterns 109 originate from code vendor environment 210, they may be distributed in one embodiment in a manner to reach all impacted endpoint systems 100 as opposed to only reaching endpoint systems that are operated by subscribers to threat intelligence feeds as is the current conventional solution.

In the exemplary embodiment of FIG. 2, management application 105 is provided in the form of security management software, e.g., such as Endpoint Detection And Response (EDR) software that includes an agent 270 (e.g., API) that communicates with other agents $260_1$-$260_N$ (e.g., APIs) running on each of respective managed endpoint information handling systems $100_1$-$100_N$ to monitor computing activity on each of these systems. In this case, management application 105 may compare the IoCs 255 and/or baseline behaviors 109 to the monitored computing activity associated with target code 107 on each of managed endpoint information handling systems $100_1$-$100_N$ to detect the presence of any IoCs associated with executing of target code 107 on any of systems $100_1$-$100_N$. Management application 105 may then execute to take one or more actions upon detection of such threat activity through agent 270 and agents $260_1$-$260_N$ of individual endpoint information handling systems $100_1$-$100_N$ (e.g., such as removal of the detected threat, isolation of the detected threat, isolation of individual affected systems $100_1$-$100_N$, issuance of a threat an alert to a system administrator via an EDR Dashboard displayed on display 140 of management system 252, etc.). Such an EDR Dashboard may also allow human analysts to view and manage security incidents and control tasks, e.g., such as manage malware detection, view malware scans, etc.

As further shown in FIG. 2, management system 252 may optionally receive additional unassociated IoCs 257 as direct feed/s or one-off notification/s provided directly to management system 252 across Internet 165 from threat and research databases 220. In such a case, management application 105 may be integrated into the threat indicator (e.g., IoC) evaluation logic in order to compare the additional IoCs 257 to the monitored computing activity associated with target code 107 on each of managed endpoint information handling systems $100_1$-$100_N$ to detect the presence of IoCs associated with executing of target code 107 on any of systems $100_1$-$100_N$.

Figure 3:
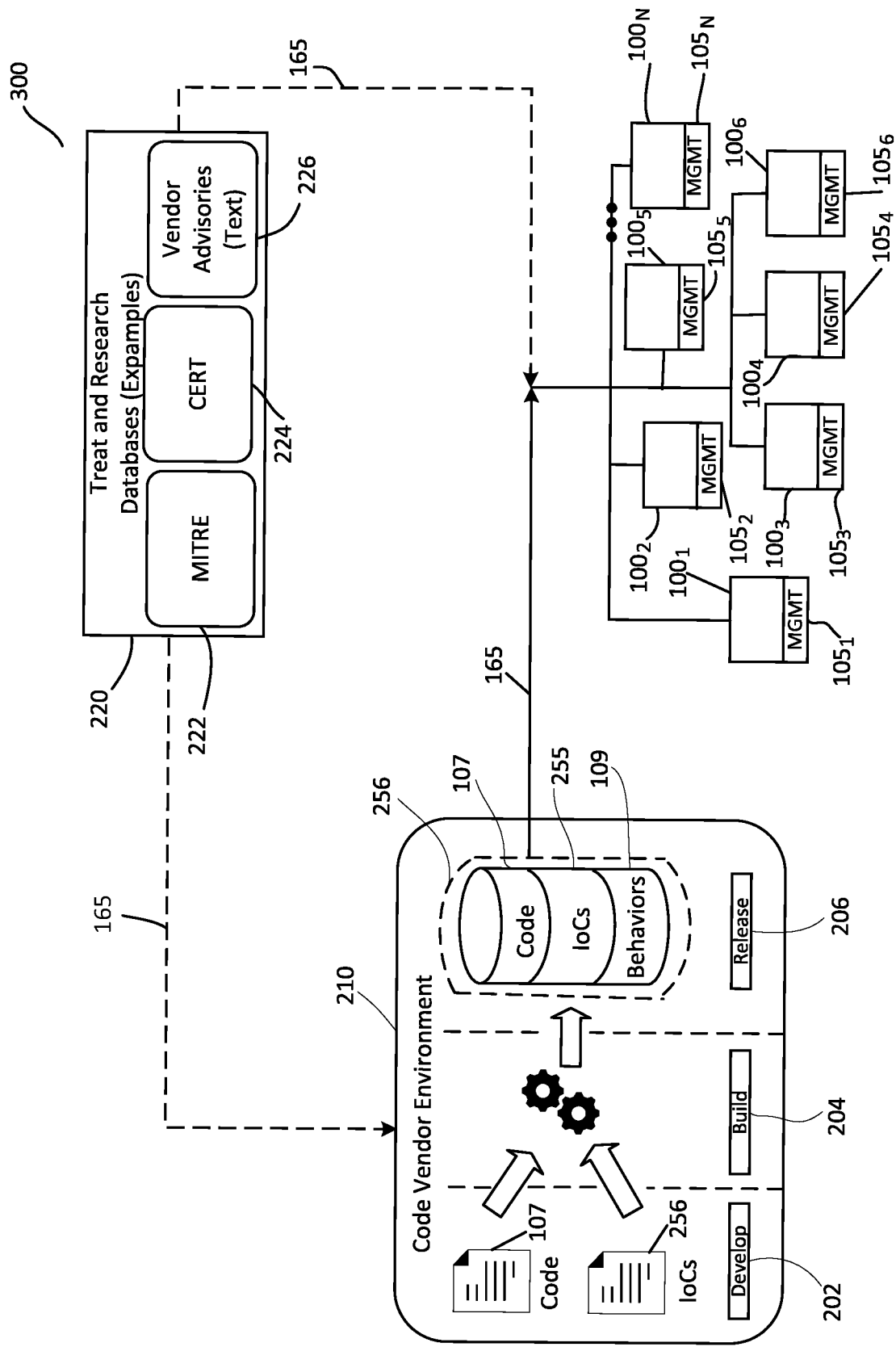
FIG. 3 illustrates an architecture and methodology according to one exemplary embodiment of the disclosed methods and systems.

FIG. 3 illustrates an alternate embodiment of an architecture and methodology 300 for implementing automated distribution of threat indicator (e.g., IoC) information to separate multiple information handling systems $100_1$ to $100_N$, and detection of IoCs on multiple endpoint information handling systems $100_1$ to $100_N$ corresponding to execution of target code 107 without the presence an intervening management system 252. In FIG. 3, each of endpoint information handling systems $100_1$ to $100_N$ is directly coupled to Internet 165, although it is alternately possible that an intervening local network may be coupled between one or more of endpoint information handling systems $100_1$ to $100_N$ and each of code vendor environment 210 and threat and research databases 220. In the exemplary embodiment of FIG. 3, architecture and methodology 300 operates similar to architecture and methodology 200 of FIG. 2, except that the code information data set 256 (e.g., containing a particular target code 107 associated with particular IoCs 255 and expected behaviors 109) is distributed directly across Internet 165 (and local network 163 where present) as a software or firmware update to each individual endpoint information handling system $100_1$ to $100_N$, where it is stored on respective system storage 160 of each individual system 100 as shown in FIG. 1.

In the embodiment of FIG. 3, separate respective management applications $105_1$ to $105_N$ executing on respective individual endpoint information handling systems $100_1$ to $100_N$ may monitor computing activity associated with target code 107 on the same given individual endpoint system 100, retrieve the IoCs 255 and/or baseline behaviors 109 from system storage 160 of the given individual endpoint system 100, and compare the retrieved IoCs 255 and/or baseline behaviors 109 to the monitored computing activity associated with target code 107 to detect the presence of any IoCs corresponding to execution of target code 107 on that same given individual endpoint 100. The management application 105 executing on the given individual endpoint system 100 may then take one or more actions upon detection of such threat activity (e.g., such as removal of the detected threat, isolation of the detected threat, isolation of the individual endpoint system 100 from the Internet 165 and/or local network 164, displaying a threat alert to a system user on display device 140 of the given individual endpoint system 100, and/or communicating an alert message across Internet 165 and/or local network 163 to a remote administrator operating a remote information handling system.

In an alternative embodiment that may be implemented on a system architecture 200 of FIG. 2 using a aspects of the methodology of FIG. 2, code information data set 256 may be distributed directly across Internet 165 and local network 163 as a software or firmware update to each individual endpoint information handling system $100_1$ to $100_N$, and then discovered by management application 105 executing on management information handling system 252. Management application 105 may then monitor computing activity on each of endpoint information handling system $100_1$ to $100_N$ to detect and act on IoCs corresponding to IoCs 255 in a manner as previously described in relation to FIG. 2.

Figure 4:
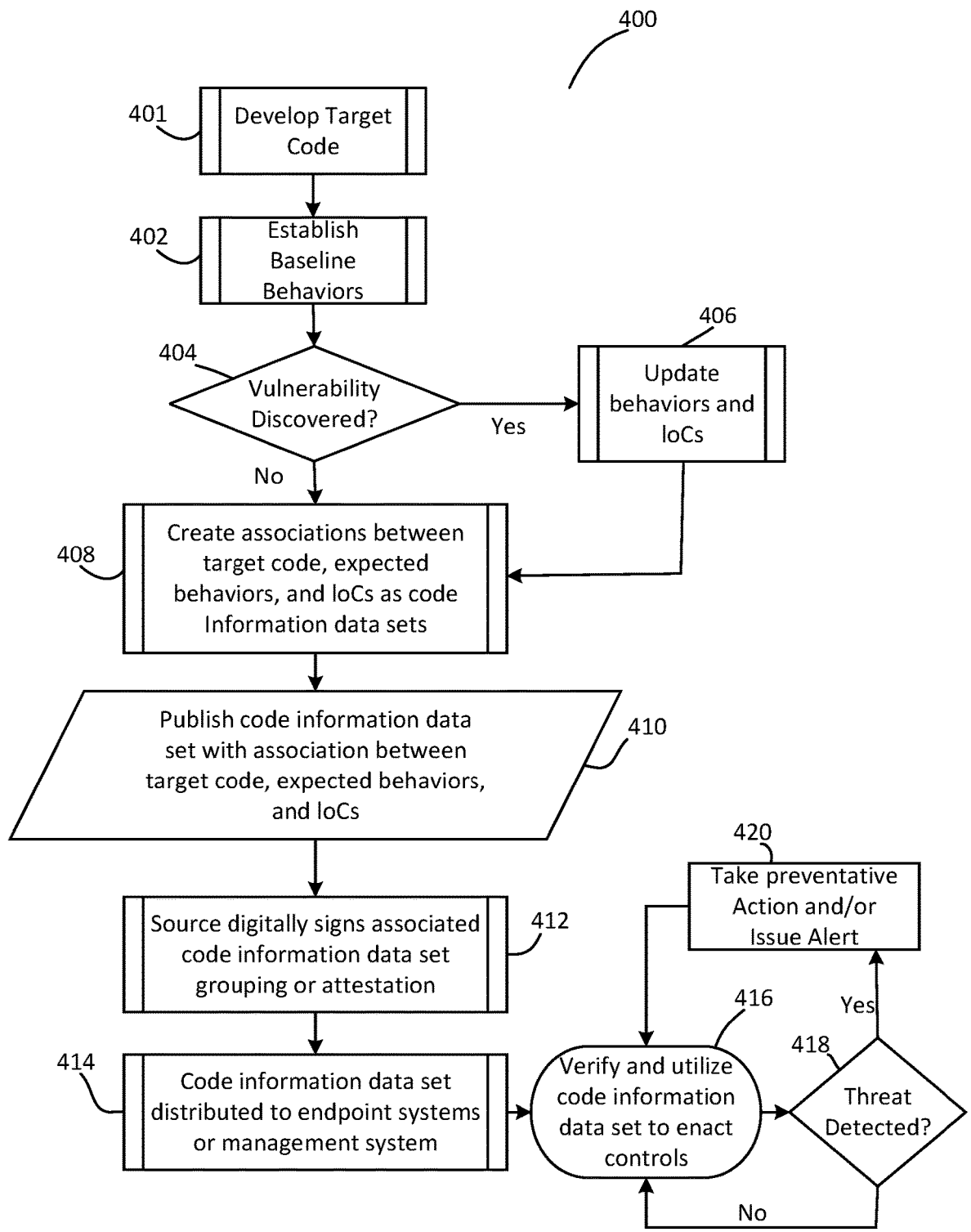
FIG. 4 illustrates methodology according to one exemplary embodiment of the disclosed methods and systems.

FIG. 4 illustrates one exemplary embodiment of a methodology 400 that may be implemented according the disclosed systems and methods, e.g., for implementation with the embodiments of FIG. 2 or 3. In one embodiment, steps 401-414 may be performed in a code vendor environment 210 previously described. Methodology 400 begins in step 401 where new target code 107 (e.g., BIOS, OS, libraries, applications, firmware, software, etc.) or update to an existing code 107 is developed.

Next, in step 402, baseline (expected) behavior patterns 109 for the target code 107 are established. Examples of such baseline or expected behavior patterns 109 include, but are not limited to, API or component interactions, communication over specific ports, protocols, or IP addresses, etc.

Next, in step 404, vulnerability testing is performed to determine if target code 107 has any discoverable vulnerabilities. This vulnerability testing of step 404 may be performed, for example, by techniques such as out-of-bounds input attempts, cross site scripting, etc. During step 404, IoCs and their corresponding IoCs 255 may be discovered by techniques such as malware analysis, threat hunting, etc. Additionally or alternatively, IoCs 255 may be received in step 404 from threat and research databases 220 (e.g., in a threatfeed containing IoCs observed in the field during actual operation of target code 107 by threat and research databases 220). During this process, human analysts in code vendor environment 210 may optionally determine any additional behavior patterns or IoCs 255 that may detect malicious activity associated with this or related vulnerabilities. If no vulnerabilities are found for target code 107 in step 404, then methodology 400 proceeds to step 408 described further below. However, if any vulnerabilities are found in step 404, then methodology 400 proceeds to step 406 where the baseline behaviors 109 of step 402 and any discovered IoCs 255 are updated for target code 107. In this regard, the expected baseline behavior 109 of target code 107 is mapped and adjusted.

Next, in step 408, associations are created between the target code 107 and the baseline behaviors 109 and IoCs 255 of step 404 (or updated baseline behaviors 109 and IoCs 255 of step 406). In one exemplary embodiment, these associations may be created within the envelope of a code information data set 256 using software descriptors that are coupled or encapsulated with information about the threat indicators (e.g., IoCs) 255 and/or behavior patterns 109, e.g., so that the IoCs 255 and baseline behavior intelligence 109 may be provided as associated data directly in the code information data set 256 to individual information handling systems $100_1$ to $100_N$, and/or through a management system 252 accessing the code inventory 107 and associated data of code information data set 256 to apply the IoCs 255 and/or behavior patterns 109 as controls to detect and/or thwart attacks and other malicious activity. Examples of software descriptors that may be used to associate the baseline behaviors 109 and IoCs 255 with target code 107 in a code information data set 256 include, but are not limited to, software identification tag descriptors employing the Software Identification (SWID) Tag format defined by the International Organization for Standardization (ISO) and the International Electrotechnical Commission (IEC) standard ISO/IEC 19770-2:2015, corrected version March 2017; descriptors employing the Concise Software Identification (CoSWID) Tags defined by Internet Engineering Task Force (IETF), "Concise Software Identification Tags", Active Internet Draft (draft-ietf-sacm-coswid-15), May 4, 2020; each of which is incorporated herein by reference in its entirety for all purposes.

In one embodiment, a code information data set 256 may be so created as a structured data set in step 408 using Extensible Markup Language (XML), JavaScript Object Notation (JSON), Concise Binary Object Representation (CBOR), etc. or with each piece of information as a claim in a CBOR Web Token, JSON Web Token, Entity Attestation Token (EAT) or other combined information set. In one embodiment, a code information data set 256 may be structured according to a Resource-Oriented Lightweight Information Exchange (ROLIE) Computer Security Incident Response Team (CSIRT) extension descriptor format to group information about a software descriptor for a target code 107 with named discovered vulnerabilities of the target code 107 from step 404, and which may then be linked to IoCs 255 and baseline behavior information 109 of code information data set 256. Information regarding ROLIE and ROLIE CSIRT extensions may be found in Internet Engineering Task Force (IETF) "Resource-Oriented Lightweight Information Exchange (ROLIE)", RFC 8322, February 2018; and in Internet Engineering Task Force (IETF) "Definition of ROLIE CSIRT Extension", draft-ietf-mile-rolie-csirt-06, Oct. 28, 2019; each of which is incorporated herein by reference in its entirety for all purposes. In another exemplary embodiment, a code information data set 256 may be structured according to DMTF RedFish®.

The code information data set 256 from step 408 (containing the association between target code 107, IoCs 255 and baseline behavior information 109 is next published in step 410. In this embodiment, code vendor environment 210 may be a validated source that digitally signs the envelope (e.g., as a group of associated items or a serialized signed list that form an attestation) of published code information data set 256 in step 412, e.g., using a private key asymmetrical encryption technique with public key infrastructure (PKI) and corresponding public key. It will be understood that in other embodiments a code information data set 256 may be provided from any other trusted source, e.g., such as in a threat feed from threat and research databases 220.

Thus, SWID, CoSWID, or other software descriptor may be signed by the originator and then coupled with IoCs 255 and/or baseline behaviors 109 for which the resulting envelope of code information data set 256 of software descriptor and IoCs 255 and/or behavior patterns 109 is digitally signed to allow assessment of trust. For example, in the case of SWID, this may be accomplished through the XML for the SWID, plus a schema that includes the IoCs 255 and/or baseline behaviors 109, which are then together digitally signed. In the example of CoSWID, the signed CoSWID may be included as a claim in an 'attestation' with additional claims included that are the associated IoCs 255 and/or baseline behaviors 109. Since CoSWID is written in CBOR, this may logically use the CBOR Object Signing and Encryption (COSE) Web Token format to create the attestation and then may be signed.

Following are example XML schemas, where XML signature is used to envelope and sign both sets of content to join them:

<signature><XML>SWID</XML><XML>IoCs</XML></signature>

The following shows a high-level mockup of a CBOR Web Token (CWT) where the IoCs may be contained as claims in a CWT that encapsulates a CoSWID that may be signed by the target code creator.

<CWT>Claims including timestamp, IoCs <embedded CWT>CWT with CoSWID as signed payload</embedded CWT></CWT>

It will be understood that expected (baseline) behaviors 109 of target code 107 may also be coupled in the same way with the software descriptors and IoCs 255. The signature aids in resiliency, depending on the trust of the certificate and root certificate used for signing to prevent spoofing or malicious entries from being added that could have an adverse impact on software or a system.

Next, in step 414, the digitally-signed code information data set 256 (including target code 107 combined with IoCs 255 and/or expected behavior patterns 109) is distributed directly from the validated source of step 412 to each individual endpoint information handling system $100_1$ to $100_N$ (i.e., embodiment of FIG. 3), or to a management information handling system 252 (i.e., embodiment of FIG. 2).

When received in step 416, the digitally-signed code information data set 256 is verified in step 416 by a management application 105 executing on each recipient system (e.g., each of individual endpoint information handling system/s 100 or by management information handling system 252) using a public key from the validated source of step 412. Successful verification of data set 256 in step 416 is a precondition to further use of target code 107, IoCs 255 and/or expected behavior patterns 109. Thus, in the case that a given code information data set 256 cannot be verified in step 416 by the recipient, then no further action is taken using target code 107 and the other information of that given code information data set 256, i.e., methodology 400 terminates in step 416 without using code information data set 256 and preceding to steps 418 and 429.

After code information data set 256 is verified as trusted in step 416, the IoCs 255 and associated baseline behaviors 109 associated with the corresponding software descriptors may be obtained (e.g., read) from the given code information data set 256 and used for the secure management of endpoint information handling system $100_1$ to $100_N$ and for identification of threats (e.g., presence of IoCs) or unexpected behaviors (e.g., such as unauthorized attempts by target code 107 to access the Internet, attempts by target code 107 to access unauthorized web addresses, etc.)

Actions may be automatically taken in step 420 once IoCs 255 and/or unexpected behaviors that deviate from baseline behaviors 109 are detected in step 418 by management application 105 executing on recipient information handling system/s on which the code information data set 256 was received (e.g., executing either on individual endpoint information handling system/s 100 or on management information handling system 252). Where the code information data set 256 is distributed directly to each individual endpoint information handling system $100_1$ to $100_N$, the code information data set 256 may be separately stored on system storage 106 of each individual endpoint information handling system $100_1$ to $100_N$, and the target code 107 installed and executed on each individual endpoint information handling system $100_1$ to $100_N$. Where the code information data set 256 is distributed via intervening management information handling system 252, the code information data set 256 may be stored on system storage 106 of management application 105 executing on endpoint information handling system 100, before target code 107 is distributed from management information handling system 252 to each individual endpoint information handling system 100 for installation and execution thereon.

In the exemplary embodiment of FIG. 3, the management application 105 on each given individual endpoint information handling system 100 may utilize IoCs 255 and/or expected behavior patterns 109 in step 418 to detect in real time the presence of any threats (IoCs) that correspond to threats associated with the target code 107 on the given information handling system. In step 420, the management application 105 of each given individual information handling system 100 may also take automatic preventative actions and/or issue alerts in real time when an IoC associated with an affected target code 107 is detected that is associated with an affected target code 107 on an affected endpoint information handling system 100 in a manner as previously described.

Examples of automatic preventative actions include, but are not limited to, removal of the detected threat from an affected endpoint information handling system 100, isolation of the detected threat by preventing network traffic only to and from the detected threat, isolation of the affected target code 107 by preventing network traffic only to and from the affected target code 107, or isolation of an affected individual affected system 100 by preventing all network traffic to and from the affected system 100.

Examples of issued alerts include, but are not limited to, displaying a threat alert to a system user on a display device 140 of a given affected individual endpoint system 100 and/or on a display device 140 of a management system 252 that is managing the given affected individual endpoint system 100, and/or communicating an alert message across Internet 165 and/or a local network 163 to a remote administrator operating a remote information handling system.

In the exemplary of FIG. 2, target code 107 may be deployed in step 416 from code information data set 256 to each of managed endpoint information handling systems $100_1$-$100_N$ by the management application 105 executing on management information handling system 252 for installation and execution thereon Management application 105 executing on management information handling system 252 may then use IoCs 255 and/or baseline behaviors 109 to monitor computing activity on each of endpoint information handling systems $100_1$-$100_N$, and to detect threats corresponding to execution of target code 107 on each of these systems. The management application 105 executing on the management information handling system 252 may also take automatic preventative actions and/or issue alerts in real time when an IoC is detected on any of endpoint information handling systems $100_1$-$100_N$ in a manner described elsewhere herein.

In a further embodiment, software descriptors (that are used to associate the baseline behaviors 109 and IoCs 255 with target code 107 in a code information data set 256) may be optionally together with associated signatures from the code vendor environment 210 in an allow list to ensure only trusted applications such as target code 107 are running on each standalone individual endpoint information handling system 100 (e.g., such as in embodiment of FIG. 3), or on each of the individual endpoint information handling systems $100_1$-$100_N$ managed by management information handling system 252 (e.g., such as in embodiment of FIG. 2).

With regard to the embodiment of FIG. 4, human analysts acting within code vendor environment 210 during step 406 may determine if an allow list or preferred list of baseline accepted behaviors 109 should be created or such an existing list currently requires updating. It is further possible that known behaviors to block may also be determined and a deny list developed. This may be desirable, for example, for use with more complex target code applications that have variations of behavior possible between configurations. IoCs 255, in addition to behavior patterns 109, may also include static values associated with an attack vector such as a hash of a file or a key phrase. In one embodiment, an analysis and distribution pattern for expected behaviors 109 may be implemented according to Manufacturer Usage Description, RFC8520 by releasing new "MUD files" with expected baseline behaviors and actions. The MUD file pattern may be specific to a system and not individual to software where associations are made and the sets of information connected to a software inventory can be used to determine threats or unusual behavior patterns.

EXAMPLES

The following examples are hypothetical and exemplary only. In the following examples, a provider of target code (e.g., BIOS, firmware, libraries, etc.) creates a software descriptor for their software package. In this example, the target coder provider uses the ISO SWID standard for the software descriptor. In order to associate expected behavior patterns, they use an attestation format where the SWID tag is a claim, the expected behaviors are another claim, and any known IoCs are an additional claim. This associated data set is digitally signed in a JSON Web Token (JWT), as would occur in an Entity Attestation Token (EAT). The exemplary technique of these examples include creating this associated data set, and then enabling access to the attestation information to distribute it across a network/s to information handling system/s where the target code is used by a management application on an endpoint information handling system (or by a management information handling system that monitors and manages endpoint information systems). The associated information of the code information data set may then be used in these examples by management application 105 (or any other code executing on host programmable integrated circuit 110, EC or BMC 180, etc.) on the recipient information handling system/s to enact controls to detect threats.

Example 1

Assume that a human threat detection analyst discovers a new attack pattern. The analyst determines the pattern is associated with a specific software package. The threat analyst creates a structured data set that includes the software descriptor, behavior patterns to block (deny list), and the associated IoCs. Alternatively, the threat analyst creates a structured data set that includes the software descriptor, behavior patterns to allow (allow list), and the associated IoCs. This information is made available to customers of the threat feed provider and then is distributed through the customers management information handling systems (e.g., stations) to the relevant endpoint information handling systems to enact detection and prevention controls at the end point.

Example 2

Assume that a software provider publishes an Entity Attestation Token (EAT) that contains a software descriptor and expected behavior patterns. This is consumed (push or pull) by a management information handling system (e.g., on device/system or remote management). The software inventory for the system is maintained in a structured format that maintains the provided associations that include common practices such as vulnerability information, but also include the expected behavior patterns and IoCs. Local application programming interfaces (APIs) to an endpoint information handling system (e.g., using local or remote management) utilize this information to enact security controls to detect and where applicable prevent and/or alert on detection of unexpected behaviors or IoCs.

It will understood that the particular combination of steps of FIG. 4 is exemplary only, and that other combinations of additional and/or alternative steps may be employed that are suitable for distributing and integrating information regarding threat indicators or indicators of compromise (IoCs) as they occur in real time, and for combining such threat indicator characteristic information in real time with application behavior patterns, information handling system types, and/or target code types so that they may be automatically applied to implement malicious attack defense at the level of the target code and/or information handling system level.

It will also be understood that one or more of the tasks, functions, or methodologies described herein (e.g., including those described herein for components 105, 110, 171, 180, 210, 220, 252, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method, comprising:
  performing the following within a code vendor environment:
    developing an executable target code,
    then associating the executable target code with one or more threat indicators and/or one or more behaviors, and
    then creating a data set including the executable target code and the one or more associated threat indicators and/or behaviors;
  then releasing the data set from the code vendor environment by providing the data set including the executable target code and the one or more associated threat indicators and/or behaviors across a network from a first information handling system of the code vendor environment to at least one other different information handling system that comprises an endpoint information handling system or to a second information handling system that is different from each of the first information handling system and the endpoint information handling system, and that is coupled to and managing the endpoint information handling system;
  then receiving the data set including the executable target code from across the network, and installing the executable target code from the data set onto the endpoint information handling system;
  then executing the installed executable target code from the data set on a programmable integrated circuit of the endpoint information handling system while using the associated threat indicators and/or behaviors to detect the presence of a threat associated with the executable target code on the endpoint information handling system without taking any further action to associate the executable target code with the one or more threat indicators and/or one or more behaviors; and then taking at least one automatic action and/or providing at least one alert only upon detection of the presence of the threat associated with the executable target code on the endpoint information handling system;

where the one or more behaviors comprise at least one of expected behaviors associated with the executable target code or unexpected behaviors associated with the executable target code.

2. The method of claim 1, where the automatic action comprises isolating the endpoint information handling system by preventing all network traffic to and from the endpoint information handling system.

3. The method of claim 1, where the providing the at least one alert comprises at least one of displaying a message indicating the detected presence of the detected threat or detected unexpected behavior on a display device of the endpoint information handling system or on a display device of the second information handling system managing the endpoint information handling system, or communicating a message indicating the detected presence of the detected threat or detected unexpected behavior across the network to a third information handling system that is different from each of the endpoint information handling system and the second information handling system managing the endpoint information handling system.

4. The method of claim 1, where the threat indicators comprise at least one of known malware hashes, code that is shared on pastebins, suspicious domains, or IP addresses that are associated with malicious activity, where the behaviors comprise expected baseline behavioral patterns for the executable target code; and where the method further comprises using at least one programmable integrated circuit of the endpoint information handling system to:

use the associated threat indicators and/or behaviors to detect the presence of the threat associated with the executable target code on the endpoint information handling system; and take the at least one automatic action and/or provide the at least one alert only upon detection of the presence of the threat associated with the executable target code on the endpoint information handling system.

5. The method of claim 1, where the threat indicators comprising at least one of known malware hashes, code that is shared on pastebins, suspicious domains, or IP addresses that are associated with malicious activity, where the behaviors comprise expected baseline behavioral patterns for the executable target code; and where the method further comprises using at least one programmable integrated circuit of the second information handling system managing the endpoint information handling system to:

use the associated threat indicators and/or behaviors to detect the presence of the threat associated with the executable target code on the endpoint information handling system; and take the at least one automatic action and/or provide the at least one alert only upon detection of the presence of the threat associated with the executable target code on the endpoint information handling system.

6. The method of claim 1, further comprising performing vulnerability testing of the developed executable target code to determine the threat indicators before performing the associating of the executable target code with the one or more determined threat indicators, and before then releasing the data set from the code vendor environment by providing the data set including the executable target code and the one or more associated threat indicators and/or behaviors across the network from the first information handling system to the at least one other different information handling system.

7. The method of claim 5, there the second information handling system managing the endpoint information handling system is coupled between the network and the endpoint information handling system.

8. The method of claim 1, further comprising digitally signing the data set including the executable target code and the one or more associated threat indicators and/or behaviors before then releasing the data set from the code vendor environment by providing the data set across the network from the first information handling system to the at least one other information handling system; and then verifying the digitally signed data set on the at least one other information handling set as a precondition to then executing the executable target code on the programmable integrated circuit of the endpoint information handling system while using the associated threat indicators and/or behaviors to detect the presence of a threat associated with the executable target code on the endpoint information handling system.

9. The method of claim 1, where the target code included within the data set comprises at least one of a word processing application, email application, photo editing application, Internet browser, computer game, PDF viewer, or spreadsheet application.

10. The method of claim 1, where the executable target code is a newly developed executable target code that is developed in the code vendor environment by a code creator; where the data set including the executable target code and the one or more associated threat indicators and/or behaviors is also created by the code creator; and where the releasing the data set from the code vendor environment comprises releasing the newly developed executable target code and the one or more associated threat indicators and/or behaviors from the code creator of the code vendor environment in the data set across the network from the first information handling system to the at least one other information handling system.

11. The method of claim 1, further comprising performing the following within the code vendor environment for the executable target code;

establishing baseline behavior patterns as the behaviors for the executable target code;

performing vulnerability testing to identify the threat indicators for the executable target code; and then associating the executable target code with the established baseline behavior patterns of the behaviors and the identified threat indicators.

12. A system, comprising:

at least one first information handling system of a code vendor environment comprising a first programmable integrated circuit and being coupled to a first network, the first information handling system accessing a data set including an executable target code created by a code creator on the first information handling system and one or more threat indicators and/or one or more behaviors associated by the code creator with the executable target code on the first information handling system; and at least one second information handling system different from the first information handling system, and comprising a second programmable integrated circuit and being coupled to the first network;

where the first programmable integrated circuit of the first information handling system is programmed to release the data set from the code vendor environment by providing the data set including the executable target code and the one or more associated threat indicators and/or behaviors across the first network from the first information handling system of the code vendor environment to the second information handling system;

where the second programmable integrated circuit of the second information handling system is programmed to:
use the associated threat indicators and/or behaviors from the data set to detect the presence of a threat associated with the executable target code executing on an endpoint information handling system without taking any further action to associate the executable target code with the one or more threat indicators and/or one or more behaviors, and
then take at least one automatic action and/or provide at least one alert only upon detection of the presence of the threat associated with the executable target code on the endpoint information handling system; and where the one or more behaviors comprise at least one of expected behaviors associated with the executable target code or unexpected behaviors associated with the executable target code.

13. The system of claim 12, where the endpoint information handling system is the second information handling system; and where the executable target code is executing on the second programmable integrated circuit of the second information handling system.

14. The system of claim 12, where the endpoint information handling system is a third information handling system that is different from the first information handling system and the second information handling system, the third information handling system comprising a third programmable integrated circuit executing the executable target code, and the third endpoint information handling system being coupled to the second information handling system by the first network or by a second network that is different from the first network with the second information handling system managing the third information handling system across the first network or the second network.

15. The system of claim 12, where the automatic action comprises at least one of removing the detected threat from the endpoint information handling system, isolating the detected threat by preventing network traffic only to and from the detected threat, isolating the executable target code by preventing network traffic only to and from the affected executable target code, or isolating the endpoint information handling system by preventing all network traffic to and from the endpoint information handling system.

16. The system of claim 12, where the at least one alert comprises at least one of a displayed message indicating the detected presence of the detected threat or detected unexpected behavior on a display device of the endpoint information handling system or on a display device of an information handling system managing the endpoint information handling system, or a message indicating the detected presence of the detected threat or detected unexpected behavior that is communicated across the first network to a third information handling system that is different from the first information handling system and the second information handling system.

17. The system of claim 12, further using at least one second programmable integrated circuit of the second information handling system to:

use the associated threat indicators and/or behaviors to detect the presence of the threat associated with the executable target code on the endpoint information handling system; and
take the at least one automatic action and/or provide the at least one alert only upon detection of the presence of the threat associated with the executable target code on the endpoint information handling system.

18. The system of claim 12, where the first programmable integrated circuit of the first information handling system is programmed to digitally sign the data set including the executable target code and the one or more associated threat indicators and/or behaviors before then releasing the data set from the code vendor environment by providing the data set across the first network from the first information handling system of the code vendor environment to the second information handling system; and where the second programmable integrated circuit of the second information handling system is programmed to then verify the digitally signed data set as a precondition to using the associated threat indicators and/or behaviors to detect the presence of a threat associated with the executable target code executing on the endpoint information handling system.

19. The system of claim 12, where the executable target code is associated with the one or more threat indicators and/or one or more behaviors within the data set by one or more software identification tags.

20. An information handling system, comprising a programmable integrated circuit programmed to receive a data set across a first network, the data set including an executable target code and one or more threat indicators and/or one or more behaviors associated with the executable target code; and where the programmable integrated circuit of the information handling system is further programmed to perform the following before generating or providing any alert:
use the associated threat indicators and/or behaviors from the data set to detect the presence of a threat associated with the executable target code when executing on an endpoint information handling system; and
then take at least one automatic action only upon detection of the presence of the threat associated with the executable target code when executing on the endpoint information handling system;
where the threat indicators comprise at least one of known malware hashes, code that is shared on pastebins, suspicious domains, or IP addresses that are associated with malicious activity, and where the behaviors comprise expected baseline behavioral patterns for the executable target code; and
where the at least one automatic action comprises isolating the endpoint information handling system by preventing all network traffic to and from the endpoint information handling system.

21. The information handling system of claim 20, where the information handling system is the endpoint information handling system, and where the programmable integrated circuit of the information handling system is further programmed to:
install the executable target code from the data set onto the endpoint information handling system; and
execute the installed executable target code from the data set the programmable integrated circuit of the information handling system.

22. The information handling system of claim 20, where the information handling system is a first information handling system different from the endpoint information handling system and the programmable integrated circuit is a first programmable integrated circuit of the first information handling system; and where the first programmable integrated circuit is programmed to manage the endpoint information handling system across the first network or a second network that is different from the first network, the endpoint information handling system being a second information handling system having a second programmable integrated circuit executing the executable target code.

23. The information handling system of claim 20, where the executable target code is associated with the one or more threat indicators and/or one or more behaviors within the data set by one or more software identification tags.

24. The information handling system of claim 20, where the target code included within the data set comprises at least one of a word processing application, email application, photo editing application, Internet browser, computer game, PDF viewer, or spreadsheet application.

* * * * *